United States Patent
Ochi et al.

(10) Patent No.: US 10,307,843 B2
(45) Date of Patent: Jun. 4, 2019

(54) INTERNAL GEAR GRINDING METHOD

(71) Applicant: MITSUBISHI HEAVY INDUSTRIES MACHINE TOOL CO., LTD., Ritto-shi, Shiga (JP)

(72) Inventors: Masashi Ochi, Tokyo (JP); Yoshikoto Yanase, Tokyo (JP); Yasuhiro Nakamichi, Tokyo (JP)

(73) Assignee: MITSUBISHI HEAVY INDUSTRIES MACHINE TOOL CO., LTD., Ritto-Shi, Shiga (JP)

( * ) Notice: Subject to any disclaimer, the term of this patent is extended or adjusted under 35 U.S.C. 154(b) by 0 days.

(21) Appl. No.: 14/890,776

(22) PCT Filed: May 26, 2014

(86) PCT No.: PCT/JP2014/063780
§ 371 (c)(1),
(2) Date: Nov. 12, 2015

(87) PCT Pub. No.: WO2014/192672
PCT Pub. Date: Dec. 4, 2014

(65) Prior Publication Data
US 2016/0121414 A1 May 5, 2016

(30) Foreign Application Priority Data
May 29, 2013 (JP) .................................. 2013-112517

(51) Int. Cl.
*B23F 5/04* (2006.01)
*B23F 5/02* (2006.01)
(Continued)

(52) U.S. Cl.
CPC .................. *B23F 5/04* (2013.01); *B23F 5/02* (2013.01); *B23F 23/1225* (2013.01); *B24B 53/075* (2013.01)

(58) Field of Classification Search
CPC .......... B23F 5/04; B23F 5/02; B23F 23/1225; B24B 53/075
See application file for complete search history.

(56) References Cited

U.S. PATENT DOCUMENTS 1,483,606 A 2/1924 Krohn
2,228,967 A * 1/1941 Miller ..................... B23F 19/00
409/32
(Continued)

FOREIGN PATENT DOCUMENTS

CN 102470507 A 5/2012
CN 102781615 A 11/2012
(Continued)

OTHER PUBLICATIONS

International Preliminary Report on Patentability and Written Opinion dated Dec. 10, 2015 in International Application No. PCT/JP2014/063780 with an English Translation.
(Continued)

*Primary Examiner* — Dung Van Nguyen
(74) *Attorney, Agent, or Firm* — Birch, Stewart, Kolasch & Birch, LLP

(57) ABSTRACT

Provided is an internal gear grinding method that makes it possible to grind an internal gear having arc-shaped teeth in a short amount of time. To this end, an internal gear having arc-shaped teeth and a threaded grindstone with a barrel shape having blades with a shape corresponding to the arc shape of the teeth are engaged at a predetermined axis intersection angle, and the internal gear and the threaded grindstone are made to rotate in synchronization with each other so that the tooth surface of the internal gear is ground by the blade surface of the threaded grindstone.

1 Claim, 6 Drawing Sheets

(51) Int. Cl.
*B24B 53/075* (2006.01)
*B23F 23/12* (2006.01)

(56) References Cited

U.S. PATENT DOCUMENTS

| | | | |
|---|---|---|---|
| 4,650,378 A * | 3/1987 | Zubler | B23F 1/023 409/12 |
| 8,460,064 B2 * | 6/2013 | Yanase | B23F 23/1225 451/443 |
| 9,079,292 B2 * | 7/2015 | Yanase | B23F 13/006 |
| 9,278,398 B2 * | 3/2016 | Yanase | B23F 5/04 |
| 2012/0184187 A1 | 7/2012 | Yanase et al. | |
| 2013/0051948 A1 | 2/2013 | Masuo | |
| 2013/0115856 A1 | 5/2013 | Yanase | |
| 2013/0130598 A1 | 5/2013 | Yanase et al. | |

FOREIGN PATENT DOCUMENTS

| | | |
|---|---|---|
| CN | 102791428 A | 11/2012 |
| CN | 102917827 A | 2/2013 |
| JP | 56-116947 A | 9/1981 |
| JP | 2000-130521 A | 5/2000 |
| JP | 2011-25365 A | 2/2011 |
| WO | WO 2011/013516 A1 | 2/2011 |

OTHER PUBLICATIONS

International Search Report dated Aug. 19, 2014 issued in International Application No. PCT/JP2014/063780 with an English Translation.
Chinese Office Action and Search Report dated Jul. 20, 2016, for Chinese Application No. 201480027570.8 with the English translation.

* cited by examiner

INTERNAL GEAR GRINDING METHOD

TECHNICAL FIELD

The present invention relates to an internal gear grinding method by which an internal gear having arc-shaped teeth is ground by a threaded grindstone having a barrel shape.

BACKGROUND ART

Gears are representative mechanical elements that efficiently transmit the desired amount of power or rotational motion. Thus, a large number of gears are used in transmission devices, gear shifters, and the like, and in a planetary gear mechanism of a gear shifter, for example, internal gears having arc-shaped teeth are widely used.

The processing accuracy for the gear has a direct effect on vibrations and noise in the device where the gear is used, and such gears have conventionally been ground as a finishing process for the gears. The above-mentioned grinding method for the internal gear having arc-shaped teeth is disclosed in Patent Document 1, for example.

CITATION LIST

Patent Literature(s)

Patent Document 1: Japanese Unexamined Patent Application Publication No. 2000-130521A

SUMMARY OF INVENTION

Technical Problem

Here, in the conventional internal gear grinding method, the internal gear is ground using one plate-shaped grindstone. However, when grinding using such a plate-shaped grindstone, it is only possible to grind one tooth space with each grinding operation. In other words, when grinding all tooth surfaces in the conventional internal gear grinding method, there is a need to use a plate-shaped grindstone for each tooth space of the internal gear, which increases processing time.

The present invention solves the above-mentioned problem and an object thereof is to provide an internal gear grinding method by which it is possible to grind an internal gear having arc-shaped teeth in a short period of time.

Solution to Problem

An internal gear grinding method according to a first invention solving the above-mentioned problem comprises the step of:

grinding an internal gear having arc-shaped teeth using a threaded grindstone with a barrel shape having blades with a shape corresponding to the arc shape of the teeth, by causing the internal gear to engage with the threaded grindstone at a prescribed first axis intersection angle and rotating the internal gear and threaded grindstone in synchronization with each other.

In an internal gear grinding method according to a second invention solving the above-mentioned problem, a dressing tool that dresses the threaded grindstone by engaging with the threaded grindstone at a prescribed second axis intersection angle and rotating in synchronization with the threaded grindstone is provided; and the first axis intersection angle during grinding is less than the second axis intersection angle during dressing.

Advantageous Effects of Invention

Thus, according to the internal gear grinding method according to the present invention, it is possible to grind an internal gear having arc-shaped teeth by using a threaded grindstone with a barrel shape when grinding the internal gear. In this manner, it is possible to successively grind a plurality of left and right tooth surfaces in the internal gear using a plurality of blade surfaces in the threaded grindstone, thereby allowing the internal gear to be ground in a short period of time.

BRIEF DESCRIPTION OF DRAWING(S)

DESCRIPTION OF EMBODIMENTS

An internal gear grinding method according to the present invention will be explained in detail below with reference to the drawings.

EXAMPLES

Figure 1:
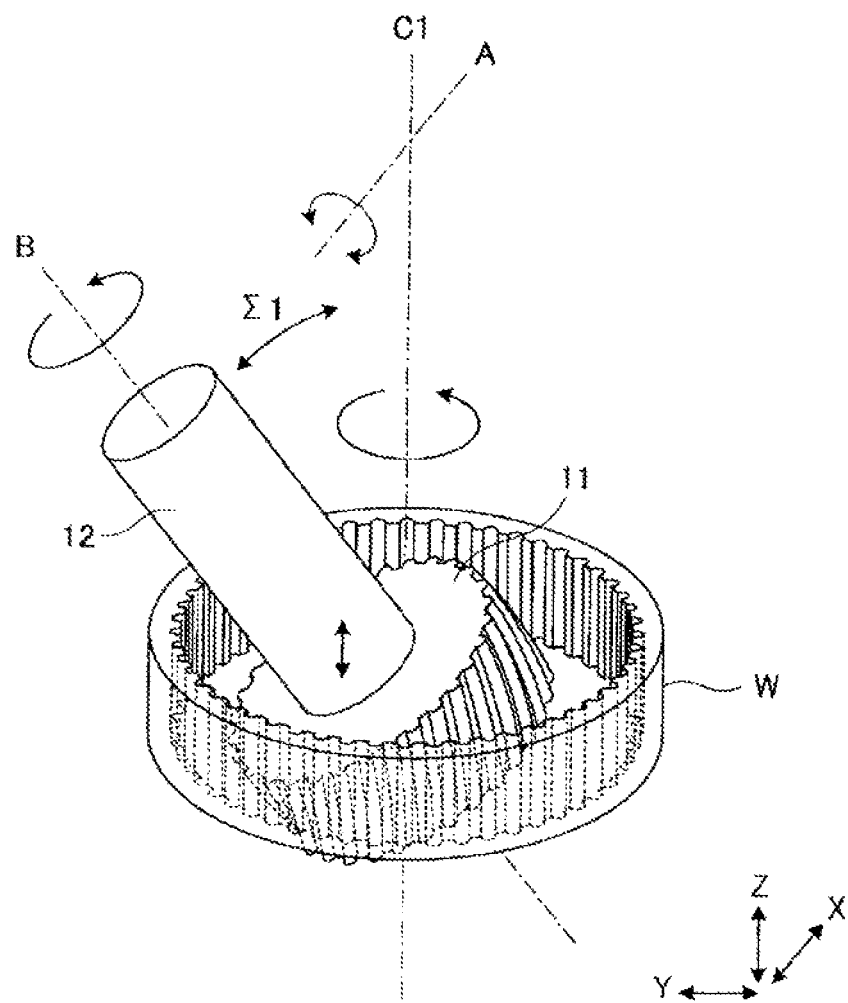
FIG. 1 is a perspective view illustrating an internal gear grinding method according to one embodiment of the present invention.
Figure 4:
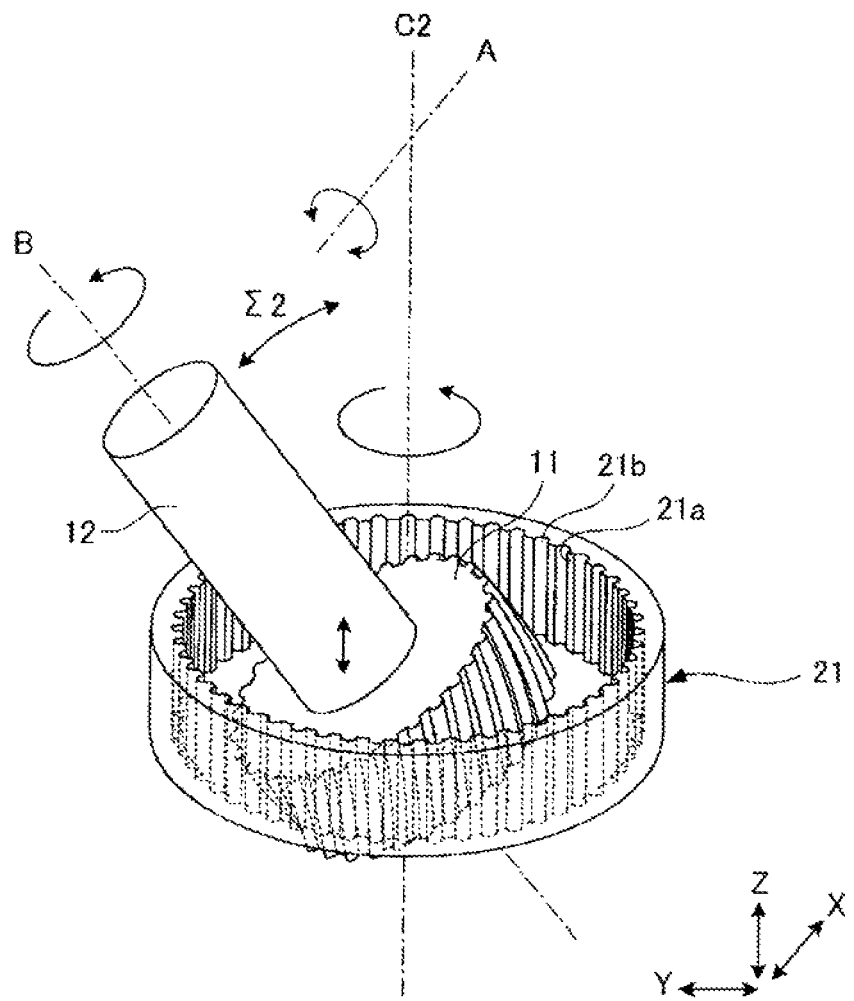
FIG. 4 is a perspective view illustrating a state in which the threaded grindstone engages a dressing gear.
Figure 5:
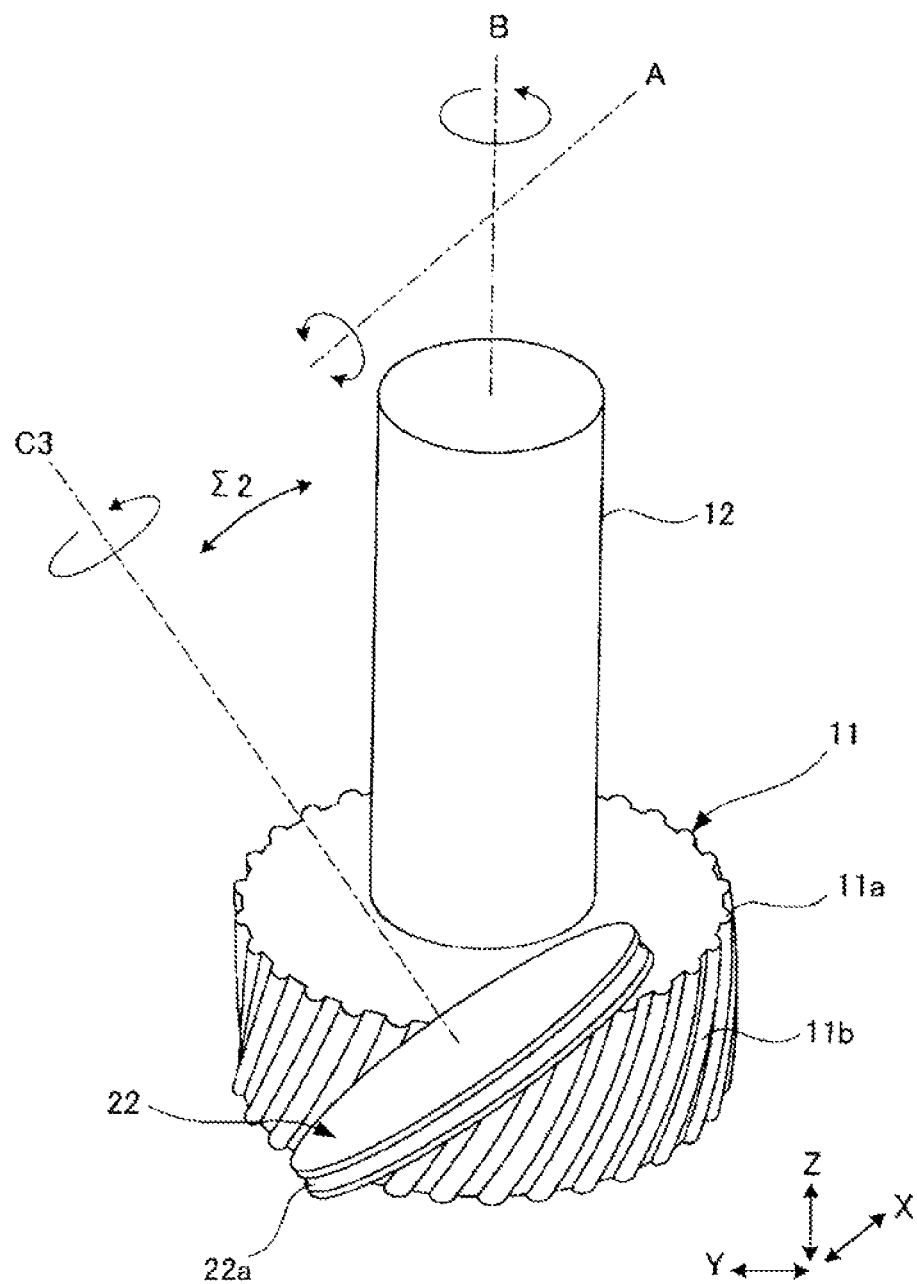
FIG. 5 is a perspective view illustrating a state in which the threaded grindstone engages a rotary dresser.

As illustrated in FIG. 1, a gear grinder (not illustrated) that employs the internal gear grinding method according to the present invention grinds an internal gear W, which is the internal gear to be processed, using a threaded grindstone 11 with a barrel shape. Additionally, as illustrated in FIGS. 4 and 5, the gear grinder has thereon a dressing function that dresses the threaded grindstone 11 using a dressing tool (a dressing gear 21 or a rotary dresser 22 to be mentioned later).

Next, the configuration of the gear grinder and an internal gear grinding method applied to such a gear grinder will be described in detail with reference to the drawings.

Figure 2A:
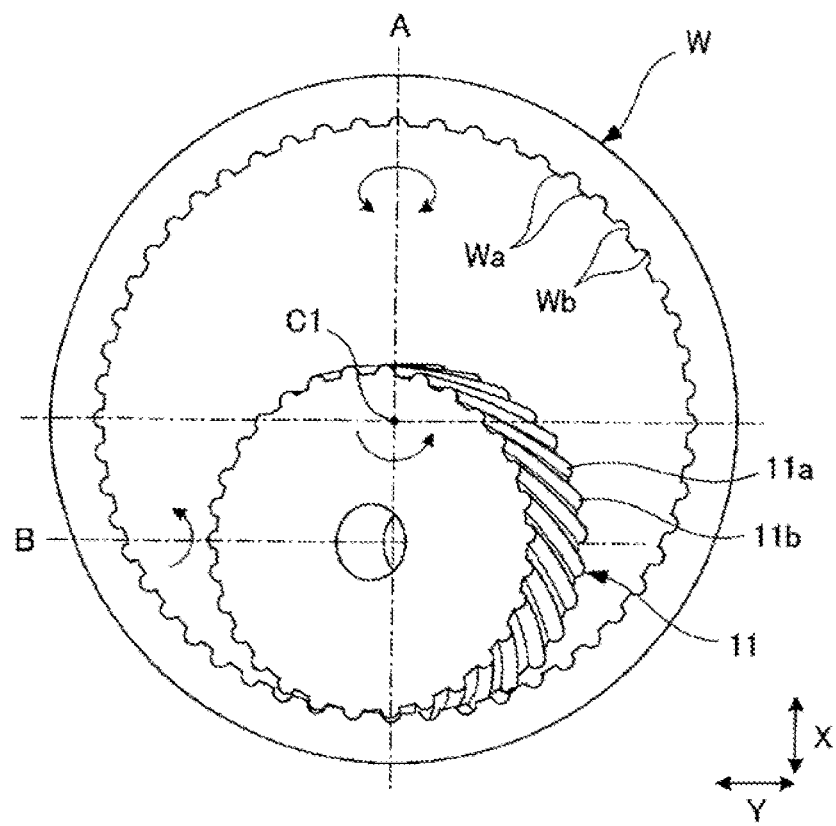
FIG. 2A is a plan view illustrating a state in which an internal gear engages a threaded grindstone.
Figure 2B:
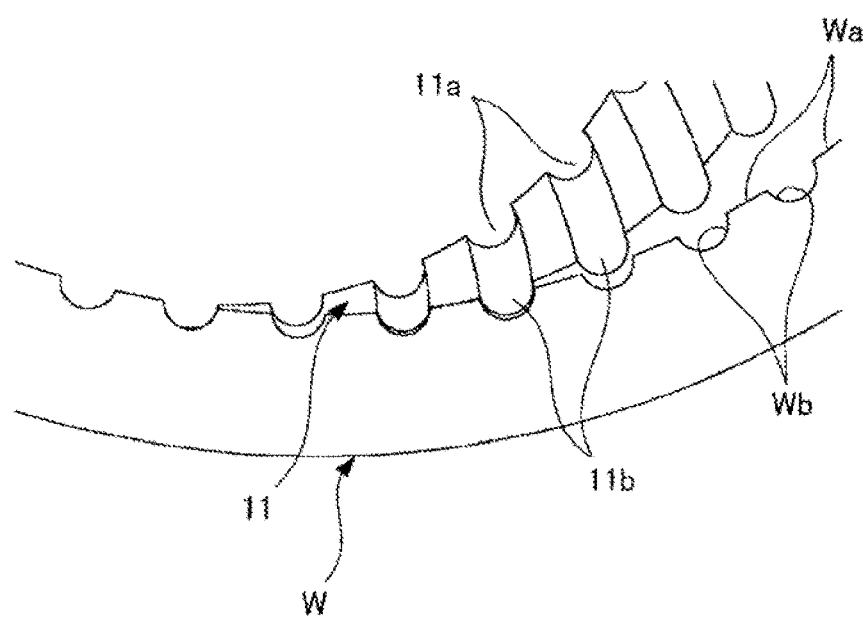
FIG. 2B is a magnified view of a main portion of FIG. 2A.

As illustrated in FIGS. 1, 2A, and 2B, in the gear grinder, a grindstone arbor 12 is supported so as to be able to move in the X axis direction (grindstone cutting direction), the Y axis direction, and the Z axis direction (grindstone feed direction), and to be able to rotate about the grindstone rotational axis B. The threaded grindstone 11, which can engage with the internal gear W, is installed on the tip of the grindstone arbor 12. Thus, moving the grindstone arbor 12 in the X axis direction, Y axis direction, and Z axis direction as well as rotating the grindstone arbor 12 about the grindstone rotational axis B allows the threaded grindstone 11 to be moved and rotated together with the grindstone arbor 12.

Furthermore, the grindstone arbor 12 is supported so as to be able to gyrate about a grindstone gyration axis A that extends in the X axis direction, and the internal gear W is supported so as to be able to rotate about a work rotational axis C1 extending in the Z axis direction. Thus, causing the grindstone arbor 12 to gyrate about the grindstone gyration axis A makes it possible to change the gyration angle (inclination angle) of the grindstone rotational axis B. In this manner, it is possible to adjust an axis intersection angle $\Sigma 1$ between the grindstone rotational axis B of the threaded grindstone 11 and the work rotational axis C1 of the internal gear W. In other words, when grinding, the threaded grindstone 11 rotates about the grindstone rotational axis B intersecting with the work rotational axis C1 of the internal gear W at the axis intersection angle $\Sigma 1$.

As illustrated in FIGS. 2A and 2B, the internal gear W has non-involute teeth. Specifically, the shape of tooth Wa of the internal gear W exhibits left/right symmetry, and left/right tooth surfaces Wb of the tooth Wa are recessed in the same arc shape. In other words, the internal gear W have non-involute gear teeth formed by arc-shaped recesses (tooth surfaces Wb).

Figure 3:
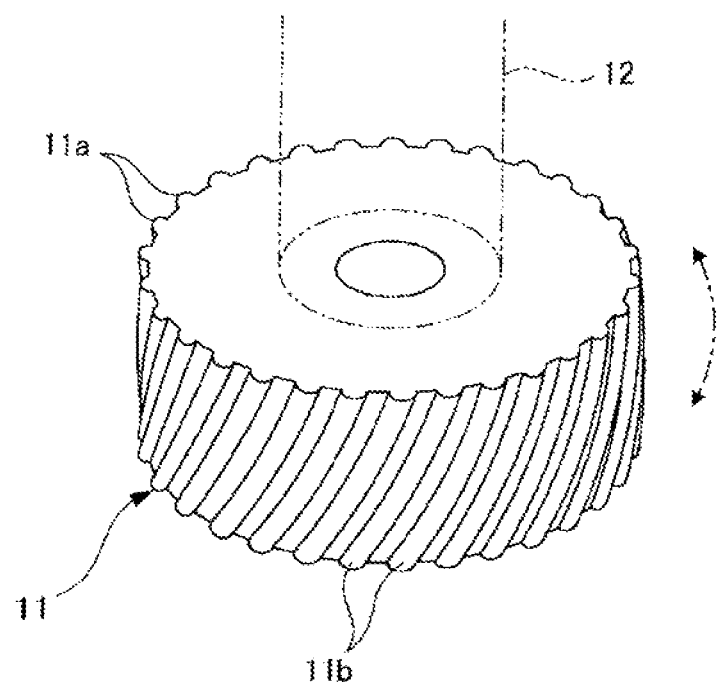
FIG. 3 is an external view of the threaded grindstone.

By contrast, as illustrated in FIGS. 2A, 2B, and 3, the threaded grindstone 11 is formed in a barrel shape so that the diameter thereof becomes gradually smaller from the middle portion toward both edges in the grindstone widthwise direction (grindstone axis direction). Furthermore, the outer peripheral portion of the threaded grindstone 11 has a plurality of screw threads 11a formed in a helical shape along the entire range of the threaded grindstone 11 in the widthwise direction thereof, and each screw thread 11a protrudes such that a cross-section thereof taken in the direction orthogonal to the twisting direction of each screw thread 11a has an arc shape.

A blade surface 11b for grinding the tooth surfaces Wb of the internal gear W is formed on the surface of each screw thread 11a along the twisting direction of the screw thread 11a. In other words, the blade surface 11b of the threaded grindstone 11 protrudes in an arc shape, and the shape of the blade surface 11b corresponds to the arc shape of each tooth of the internal gear W.

A super hard abrasive such as a vitrified CBN abrasive, for example, is used for the threaded grindstone 11. Furthermore, the shape of the barrel-shaped shaped exterior in the widthwise direction of the threaded grindstone 11 is defined according to a prescribed curvature. The curvature of the barrel shape of the threaded grindstone 11 is set according to the internal diameter of the internal gear W, the axis intersection angle $\Sigma 1$, and the like, and in order to prevent unnecessary interference at portions other than those engaged with the internal gear W, the curvature is set to as large a value as possible.

In other words, when grinding the internal gear W using the threaded grindstone 11, it is necessary to increase the slip rate (relative speed, grinding speed) therebetween in order to increase the lifespan of the grindstone. Thus, setting the axis intersection angle $\Sigma 1$ to as large a value as possible enables the above-mentioned object to be achieved. The threaded grindstone 11 is formed in a barrel shape, and thus, the threaded grindstone 11 can engage the internal gear W even when the threaded grindstone 11 is inclined at the axis intersection angle $\Sigma 1$.

Furthermore, as illustrated in FIGS. 4 and 5, the dressing gear 21 and the rotary dresser 22 can be installed on the gear grinder, and the dressing gear 21 and rotary dresser 22 are dressing tools for dressing the threaded grindstone 11. When dressing the threaded grindstone 11 in the gear grinder, either one of the dressing gear 21 and the rotary dresser 22 is selected.

Specifically, as illustrated in FIG. 4, the dressing gear 21 having the shape of an internal gear is supported so as to be able to rotate about a dressing gear rotational axis C2, which is the same axis as the work rotational axis C1. When grinding the threaded grindstone 11 using the dressing gear 21, the axis intersection angle between the grindstone rotational axis B of the threaded grindstone 11 and the dressing gear rotational axis C2 of the dressing gear 21 is set to $\Sigma 2$ by causing the grindstone arbor 12 to gyrate about the grindstone gyration axis A.

Thus, during dressing, the threaded grindstone 11 rotates about the grindstone rotational axis B intersecting with the dressing gear rotational axis C2 of the dressing gear 21 at the axis intersection angle $\Sigma 2$. Note that the axis intersection angle $\Sigma 1$ during grinding is less than the axis intersection angle $\Sigma 2$ during dressing.

The parameters of dressing gears 21 are the same as the parameters of internal gears W, and the shape of teeth 21a (left/right tooth surfaces 21b) of the dressing gear 21 is the same as the shape of the teeth Wa after grinding (left/right tooth surfaces Wb). In other words, the dressing gear 21 is a non-involute gear having teeth formed by arc-shaped recesses (tooth surfaces 21b) and can engage the threaded grindstone 11.

Meanwhile, as illustrated in FIG. 5, the plate-shaped rotary dresser 22 is supported so as to be able to move in the X axis direction, Y axis direction, and Z axis direction, and to be able to rotate about a dresser rotational axis C3. When grinding the threaded grindstone 11 using the rotary dresser 22, the axis intersection angle between the grindstone rotational axis B of the threaded grindstone 11 and the dresser rotational axis C3 of the rotary dresser 22 is set to $\Sigma 2$ by causing the grindstone arbor 12 to gyrate about the grindstone gyration axis A.

Thus, during dressing, the threaded grindstone 11 rotates about the grindstone rotational axis B intersecting with the dresser rotational axis C3 of the rotary dresser 22 at the axis intersection angle $\Sigma 2$. As described above, the axis intersection angle $\Sigma 1$ during grinding is less than the axis intersection angle $\Sigma 2$ during dressing.

Figure 6:
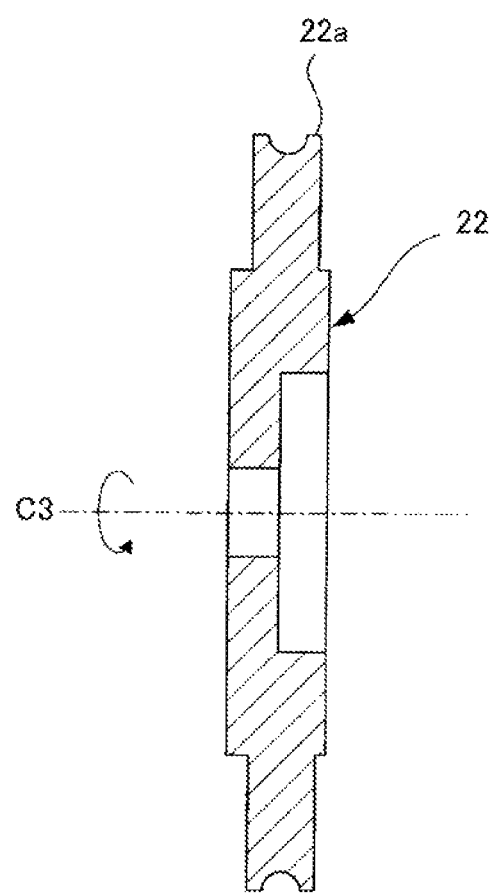
FIG. 6 is a cross-sectional view of the rotary dresser.

As illustrated in FIG. 6, the blade surface 22a is formed on the periphery of the rotary dresser 22 in the circumferential direction thereof. The shape of the blade surface 22a is the same as the shape of the teeth Wa (left/right tooth surfaces Wb) after grinding. In other words, the rotary dresser 22 has a blade shape (blade surface 22a) with the central portion thereof recessed in an arc shape, and can engage one screw thread 11a (left/right tooth surfaces 11b) of the threaded grindstone 11.

Therefore, when grinding the internal gear W using the threaded grindstone 11, first, the threaded grindstone 11 is moved in the X axis direction, Y axis direction, and Z axis direction and is caused to gyrate about the grindstone gyration axis A, as illustrated in FIG. 1. In this manner, the threaded grindstone 11 engages the internal gear W at the axis intersection angle $\Sigma 1$.

Next, the threaded grindstone 11 is rotated in the above engaged state about the grindstone rotational axis B and the internal gear W is rotated about the work rotational axis C1. The threaded grindstone 11 is cut in the X axis direction while being fed in the Z axis direction. In other words, the threaded grindstone 11 is made to cut in the X axis direction while moving back and forth in the Z axis direction. In this manner, the threaded grindstone 11 uses the blade surfaces 11b formed on the entirety of the threaded grindstone 11 in the widthwise direction to grind the tooth surfaces Wb formed on the entirety of the internal gear W in the widthwise direction.

As a result, by the axis intersection angle $\Sigma 1$ between the threaded grindstone 11 and the internal gear W and synchronous rotation thereof, a large amount of slippage occurs between the blade surfaces 11b of the threaded grindstone 11 and the tooth surfaces Wb of the internal gear W, thereby causing the tooth surfaces Wb of the internal gear W to be finely ground by the blade surfaces 11b of the threaded grindstone 11.

When grinding the internal gear W a prescribed number of times using the threaded grindstone 11, the blade surfaces 11b are worn and the threaded grindstone 11 becomes dull, and thus, the threaded grindstone 11 is periodically dressed by the dressing gear 21 or the rotary dresser 22.

When dressing the threaded grindstone 11 using the dressing gear 21, first, the threaded grindstone 11 is moved in the X axis direction, Y axis direction, and Z axis direction and is caused to gyrate about the grindstone gyration axis A, as illustrated in FIG. 4. In this manner, the threaded grindstone 11 engages the dressing gear 21 at the axis intersection angle Σ2.

Next, the threaded grindstone 11 is rotated in the above engaged state about the grindstone rotational axis B and the dressing gear 21 is rotated about the dressing gear rotational axis C2.

The threaded grindstone 11 is cut in the X axis direction while being fed in the Z axis direction. In other words, the threaded grindstone 11 is cut in the X axis direction while being moved back and forth in the Z axis direction. In this manner, the dressing gear 21 dresses the blade surfaces 11b formed on the entirety of the threaded grindstone 11 in the widthwise direction using the tooth surfaces 21b formed on the entirety of the dressing gear in the widthwise direction.

As a result, by the axis intersection angle Σ2 between the threaded grindstone 11 and the dressing gear 21 and synchronous rotation thereof, a large amount of slippage occurs between the blade surfaces 11b of the threaded grindstone 11 and the tooth surfaces 21b of the dressing gear 21, thereby causing the blade surfaces 11b of the threaded grindstone 11 to be finely ground by the tooth surfaces 21b of the dressing gear 21.

On the other hand, when dressing the threaded grindstone 11 using the rotary dresser 22, first, the threaded grindstone 11 is moved in the X axis direction, Y axis direction, and Z axis direction and is caused to gyrate about the grindstone gyration axis A, as illustrated in FIG. 5. At the same time, the rotary dresser 22 is moved in the X axis direction, the Y axis direction, and the Z axis direction. In this manner, the threaded grindstone 11 engages the rotary dresser 22 at the axis intersection angle Σ2.

Next, the threaded grindstone 11 is rotated in the above engaged state about the grindstone rotational axis B and the rotary dresser 22 is rotated about the dresser rotational axis C3.

The threaded grindstone 11 and the rotary dresser 22 are then moved relative to each other in the X axis direction, the Y axis direction, and the Z axis direction. In this manner, the rotary dresser 22 dresses the blade surfaces 11b formed on the entirety of the threaded grindstone 11 in the widthwise direction using the blade surface 22a formed on the entirety of the rotary dresser 22 in the circumferential direction.

Thus, according to the internal gear grinding method of the present invention, it is possible to grind the internal gear W by using the threaded grindstone 11 with a barrel shape when grinding the internal gear W having arc-shaped teeth. In this manner, it is possible to successively grind the tooth surfaces Wb of the internal gear W using the blade surfaces 11b of the threaded grindstone 11, thereby allowing the internal gear W to be ground in a short period of time.

Furthermore, by making the axis intersection angle Σ1 during grinding less than the axis intersection angle Σ2 during dressing, it is possible to make the engagement range between the internal gear W and the threaded grindstone 11 during grinding narrower than the engagement range between the dressing gear 21 and the threaded grindstone 11 during dressing. In this manner, it is possible to reduce the processing load (grinding load) on the internal gear W, thereby allowing the internal gear W to be highly accurately ground.

INDUSTRIAL APPLICABILITY

The present invention is applicable to an internal gear grinding method for grinding an internal gear in which the teeth have the shape of a plurality of arcs smoothly and successively formed adjacent to each other.

The invention claimed is:

1. An internal gear grinding method comprising the step of:
grinding an internal gear having arc-shaped teeth using a threaded grindstone with a barrel shape having blades with a shape corresponding to the arc shape of the teeth, by causing the internal gear to engage with the threaded grindstone at a prescribed first axis intersection angle and rotating the internal gear and threaded grindstone in synchronization with each other, wherein
a dressing gear with an internal gear shape that dresses the threaded grindstone by engaging with the threaded grindstone at a prescribed second axis intersection angle and rotating in synchronization about a dressing gear rotational axis located on the same axis as a work rotational axis of the internal gear is provided, and
wherein the first axis intersection angle during the grinding of the internal gear is smaller than the second axis intersection angle at which the threaded grindstone is dressed after grinding of the internal gear.

* * * * *